United States Patent
Becker et al.

(10) Patent No.: US 6,884,058 B2
(45) Date of Patent: Apr. 26, 2005

(54) COMBINATION CALENDER

(75) Inventors: Rupert Becker, Vöcklabruck (AT); Bruno Haider, Gmunden (AT)

(73) Assignee: SML Maschinengesellschaft m.b.H., Lenzing (AT)

( * ) Notice: Subject to any disclaimer, the term of this patent is extended or adjusted under 35 U.S.C. 154(b) by 269 days.

(21) Appl. No.: 10/212,153

(22) Filed: Aug. 6, 2002

(65) Prior Publication Data

US 2003/0031747 A1 Feb. 13, 2003

(30) Foreign Application Priority Data

Aug. 7, 2001 (EP) .............................................. 01890227

(51) Int. Cl.[7] .......................... B29C 59/04; B29C 43/44
(52) U.S. Cl. ...................... 425/186; 425/194; 425/363; 425/373
(58) Field of Search ............................... 425/183, 185, 425/186, 193, 194, 363, 373

(56) References Cited

U.S. PATENT DOCUMENTS

| | | | |
|---|---|---|---|
| 3,107,394 A | 10/1963 | Varon | |
| 3,581,340 A | * 6/1971 | Thieme | 425/183 |
| 4,408,974 A | 10/1983 | Comerio | 425/194 |
| 4,632,655 A | 12/1986 | Benkwitz | 425/186 |
| 5,006,056 A | 4/1991 | Mainstone et al. | 425/186 |
| 5,064,584 A | * 11/1991 | Jefferies | 425/183 |
| 5,362,221 A | * 11/1994 | Perkins | 425/185 |

FOREIGN PATENT DOCUMENTS

| | | |
|---|---|---|
| JP | 59-185620 | 2/1985 |
| JP | 62-053816 | 8/1987 |
| JP | 09-150429 | 10/1997 |

* cited by examiner

Primary Examiner—James P. Mackey
(74) Attorney, Agent, or Firm—Steptoe & Johnson LLP; D. Douglas Price

(57) ABSTRACT

Device (1) for manufacturing plastics films from a plastics melt and having a roll frame (3) in which at least one chill roll (2) is rotatably mounted, an exchangeable part of the device (1), for pressing the plastics melt against the chill roll (2) mounted in the roll frame (3) and for chilling the same, being attachable to the roll frame (3) and for the manufacture of plastics films with different characteristics, various modules (10) being provided as the exchangeable part, so that the device (1) allows different plastics films to be made by means of different manufacturing methods.

16 Claims, 4 Drawing Sheets

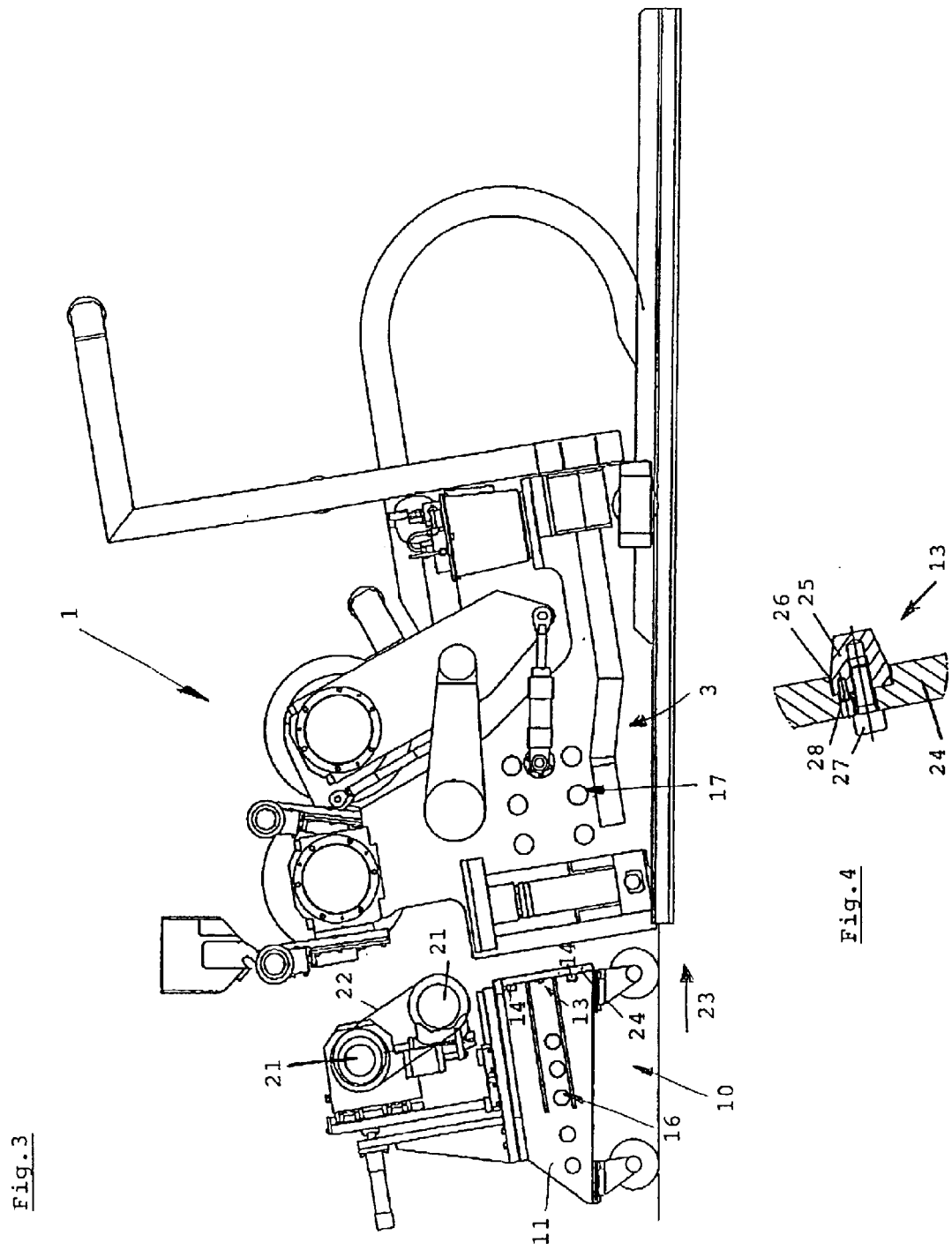

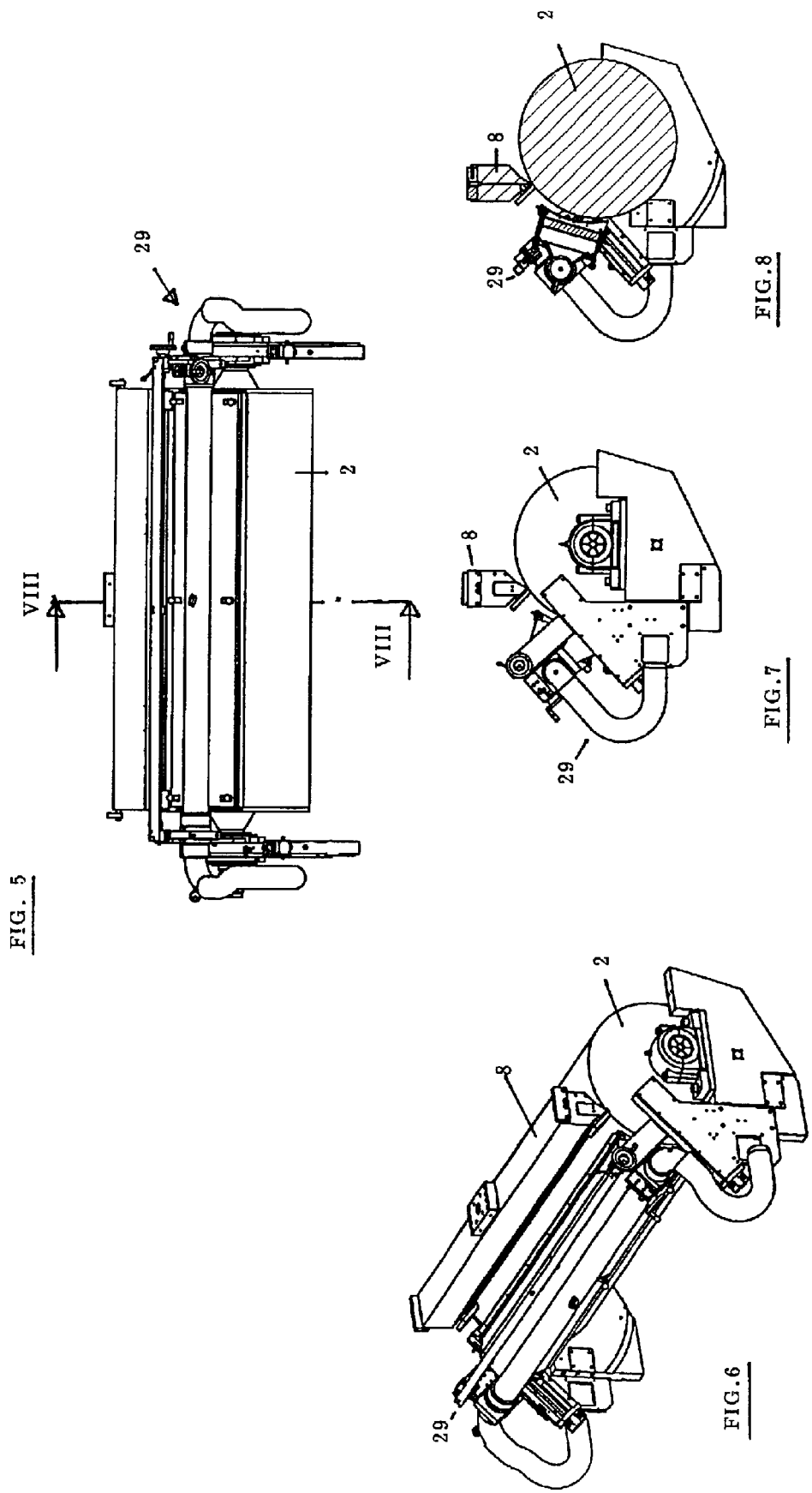

COMBINATION CALENDER

The invention relates to a device for manufacturing plastics films from a plastics melt and having a roll frame in which at least one chill roll is rotatably mounted, an exchangeable part of the device, for pressing the plastics melt against the chill roll mounted in the roll frame and for chilling the same, being attachable to the roll frame.

From U.S. Pat. No. 5,006,056 it is already known, in a device for manufacturing plastics films, to provide a chill roll on a trolley and thereby simplify the exchange of the chill roll. Although the exchange of large, heavy chill rolls is thereby made easier, only a certain type of plastics film can be manufactured with such a device.

U.S. Patent No. 4,408,974, a device for stretching plastics films is shown, in which a trolley having stretching rolls can be slid up to a roll frame or a roll mounted therein or, for maintenance purposes, can be removed from the roll frame in a quick and easy manner.

On the other hand, in the case of embossing devices for thermoplastic films, having exchangeable parts, are also known, in which devices the plastics film is embossed between an embossing roll and a back-up roll.

From U.S. Pat. No. 4,632,655, for example, an exchangeable embossing roll is known which is mounted by means of holding brackets in rails which, once fastening means have been opened, is displaceable in the axial direction. A further embossing roll can then be displaced into the production position.

U.S. Pat. No. 3,107,394 also discloses an embossing device, in which an embossing roll is pivotably mounted and hence the manufacture of the plastics film, in an exchange position of the embossing roll, does not have to be interrupted.

In JP 62 053816 A an embossing device is likewise shown, in which an embossing roll and a rubber roll can be lifted by means of a lifting cylinder into an exchange position in which the rolls can be individually exchanged.

In JP 09 150429 A a press roll is shown which can be moved by means of a lifting cylinder into a downwardly displaced position and can be transferred in this on rails into an exchange position.

In JP 59 185620 A, an embossing device is likewise shown, in which embossing rolls are mounted on swivel arms in order to obtain a quick and easy exchange of the serving embossing roll.

In all these devices, only a certain type of film, however, can in each case be finished, i.e. provided with a different surface structure.

The object of the present invention is to create, by contrast, a device for manufacturing various types of plastics films, which device can be quickly and easily converted, preferably without the use of tools and accessories, for example lifting or dismantling devices, for the manufacture of a different type of plastics film. Plastics films with different characteristics, especially plastics films with different thickness and with different surface roughness, surface structure or surface finish, should thereby be able to be manufactured.

The device according to the invention of the type stated in the introduction is characterized in that, for the manufacture of plastics films with different characteristics, various modules are provided as the exchangeable part, so that the device allows different plastics films to be made by means of different manufacturing methods. With the aid of the exchangeable modules, different manufacturing methods, for example air-pressing of the film against the chill roll (soft box, air knife), contact-pressing by a roll, contact-pressing by means of a continuous band, can be used to manufacture films exhibiting a different thickness, surface roughness, surface structure and surface finish. The different types of films which can be produced using the different manufacturing methods which can be flexibly deployed by the exchangeable modules herein differ physically and morphologically from one another.

Since the thickness of the manufactured plastics film depends, in particular, upon the device provided for pressing and chilling the plastics film, the design of the device as a quickly and easily exchangeable module, which is preferably arranged to enable it to be displaced or pivoted, produces a device for manufacturing plastics films, in which production can be switched to a wide variety of plastics films with extremely low conversion times between different manufacturing methods.

In particular, a module of this type is suitable for pressing and chilling the plastics film in a calender in which, in the roll frame, two and chill rolls are provided for chilling the plastics film. In calenders of this type, the exchange of the module for pressing and chilling the plastics film through different manufacturing methods can produce a large variation in a wide variety of plastics films of different type, in particular having different surface roughness, surface structure or surface finish and different thickness. Of course, the module for pressing and chilling the plastics film can also, however, be connected to a roll frame having a large chill roll.

In order to manufacture relatively thick plastics films with a thickness greater than 500 μm, it is favorable if the module for pressing and chilling the plastics film has a roll, for example a roll with plastics surface, a metal roll or an embossing roll.

In order to produce plastics films with a thickness of between 50 and 500 μm, which exhibit a smaller orientations, improved mechanical properties and improved optical properties compared with roll-pressed plastics films, it is advantageous if the module for pressing and chilling the plastics film has a continuous band, if necessary chilled. As the continuous band, a continuous, non-welded metal band, in particular, is used, which is also known by the term "sleeve band". The continuous band, which is also preferably chilled, serves to smooth the surface of the plastics film.

For the manufacture of plastics films with a thickness of less than 50 μm and an extremely smooth surface, it is advantageous if the module for pressing and chilling the plastics film has an air knife or a module for the surface-pressing of the plastics film, a so-called soft box or vacuum box.

If a device for introducing the plastics melt is disposed between the module for pressing and chilling the plastics film, in the fastened state, and a first roll mounted in the roll frame, the module can easily be fastened to a wide-sided end of the roll frame and the surface roughness, the surface structure or the surface finish, or the thickness of the manufactured plastics film, can be reliably defined by the nature of the pressing and cooling of the liquid plastics material against the first roll mounted in the roll frame.

For a particularly quick and easy, problem-free module exchange, it is advantageous if the module for pressing and chilling the plastics film is disposed on a trolley having a plurality of rolls.

For a simple positional fixing of the module on the roll frame, and in order to ensure an exact alignment of the module relative to the roll frame in the fastened position, it is favorable if at least one centering bolt is provided for connecting the module to the roll frame.

In this context, it is particularly favorable if the module has at least one conical centering bolt, which is tapered in the direction of its free ends, since an automatic centering is thereby effected when the connection is joined together. If the axis of the conical centering bolt is arranged essentially perpendicular to a stop plate of the trolley, the trolley can easily be slid up to a wide side of the device and connected to the roll frame.

For a quick and easy and also re-releasable connection between the trolley and the roll frame, it is advantageous if screws are provided for fastening the trolley to the roll frame.

With respect to a quick and easy connection of the module to a liquid supply for possible chilling purposes, it is favorable if plug connections are provided for the connection of coolant lines between the module and the rest of the device, bayonet connections, rapid-action couplings or the like being able to be provided as plug connections, for example. A gaseous medium can also, of course, be used for the chilling.

Similarly, for a quick and easy exchange and connection of the module, it is advantageous if plug connections are provided for the connection of hydraulic and/or pneumatic lines between the module and the rest of the device, the hydraulic and/or pneumatic lines being provided, in particular, for connection to various hydraulic and/or pneumatic cylinders for the exact positioning of the various contact-pressing devices. Here too, a wide variety of plug connections, such as bayonet fastenings, rapid-action couplings and the like, can be provided. Similarly, for the power supply to a wide variety of electrical applications of the module, it is favorable if plug connections are provided for the connection of power lines between the module and the rest of the device. As a result of the plug connections, a tool-less, rapid connection and release of all the various lines should, in particular, be possible.

The invention is explained in greater detail below with reference to preferred illustrative embodiments represented in the drawing but to which it is not intended to be limited, in which drawing, specifically:

FIG. 3 shows a view of a device similar to FIGS. 1 and 2, but having a continuous band for pressing the plastics film against a roll of the roll frame, the module having the continuous band not being fastened to the roll frame;

FIG. 4 shows in detail a cross section of a centering bolt for centering the module upon fastening to the roll frame;

FIG. 5 shows a view of a module for the surface-pressing of the plastics film, i.e. a so-called soft box;

FIG. 6 shows a perspective view of the soft box according to FIG. 5;

FIG. 7 shows a side view of the soft box according to FIG. 5; and

FIG. 8 shows a section along the line VIII—VIII in FIG. 5.

Figure 1:
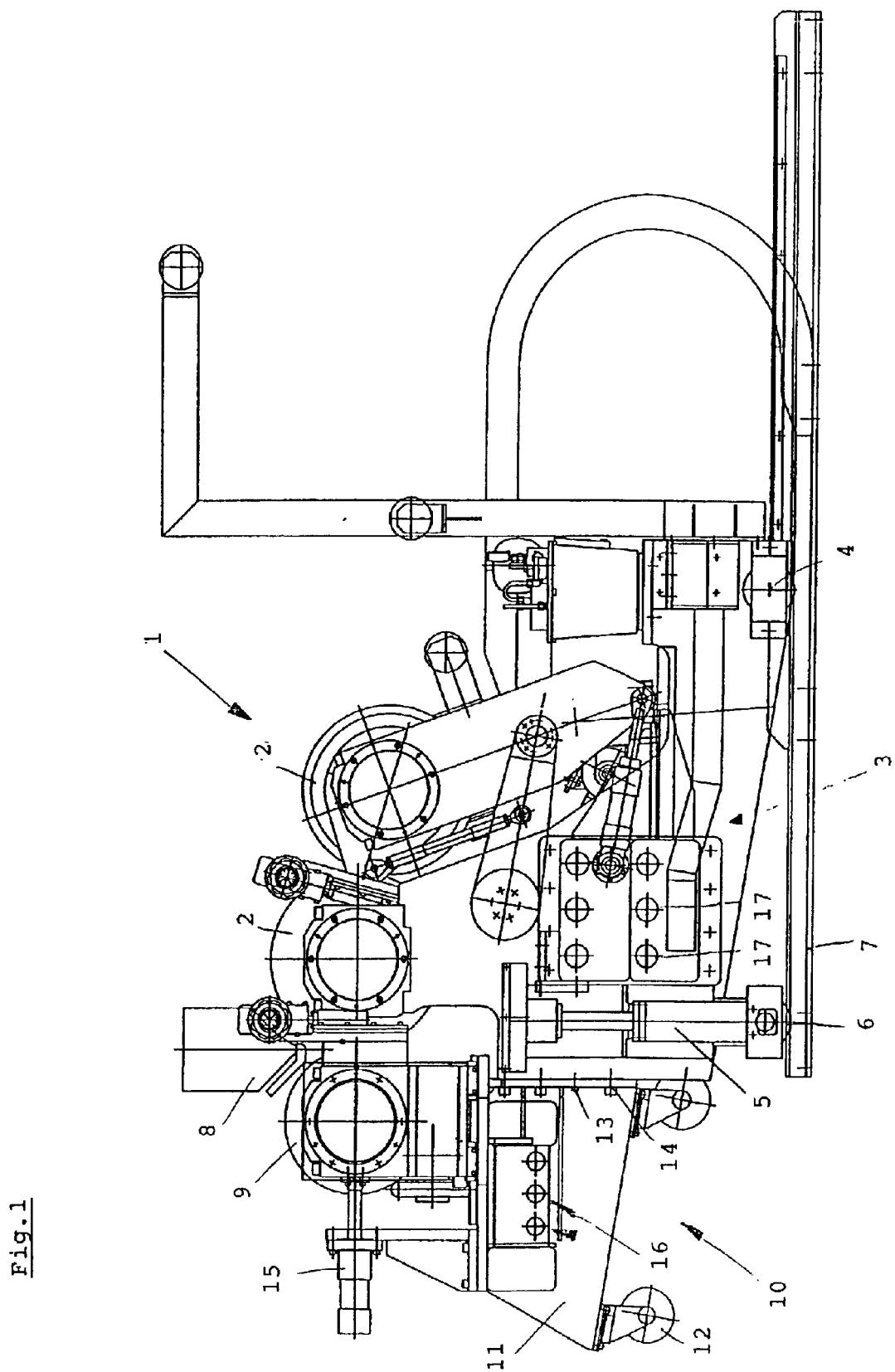
FIG. 1 shows a view of a device for manufacturing plastics films, having a roll for pressing the plastics film against a roll mounted in a roll frame.

In FIG. 1 a calender 1 is shown, in which two chill rolls 2 are mounted in a common roll frame 3, the whole of the roll frame 3 being mounted pivotably about the axis 4. For the pivoting of the roll frame 3, a spindle 5 is provided, which is mounted on a rail 7 such that it is displaceable by means of a roller 6.

Through a nozzle 8, the plastics material provided for the manufacture of the plastics film is introduced into a gap between the first chill roll 2 and the smoothing roll 9, the smoothing roll 9, for the formation of a separate, displaceable, mobile or pivotable and easily exchangeable module 10, being disposed on a trolley 11.

In the downward-pivoted position of the roll frame 3 (cf. FIGS. 2 and 3), the trolley 11 can easily be slid up to the roll frame 3 with the aid of the rollers 12, after which it is centered in its position relative to the roll frame 3 by means of two centering bolts 13 (cf. also FIG. 4) and is subsequently fastened to the roll frame 3 using fastening screws 14. The module 10 for pressing and chilling the plastics film against the chill roll 2 can thus be fastened to the roll frame 3 in an especially quick and easy manner. For the exact positioning of the smoothing roll 9 relative to the chill roll 2, a cylinder 15, which can be pneumatically or hydraulically actuated, is provided for the vertical adjustment of the smoothing roll 9.

In order to supply the module 10 with water, electricity, air or hydraulic fluid, various plug connections 16 are provided in a side wall of the trolley 11, via which, with the aid of various rapid-action couplings, a line connection can be made to plug connections 17 of the roll frame 3.

Using the modular design of the device for pressing and chilling the plastics film against the chill roll 2, the device 1 can thus be converted from the smoothing roll 9 shown in FIG. 1 to various other devices for pressing and chilling the plastics film against the chill roll 2. The production stoppage for a conversion operation usually amounts here to less than 45 minutes.

Figure 2:
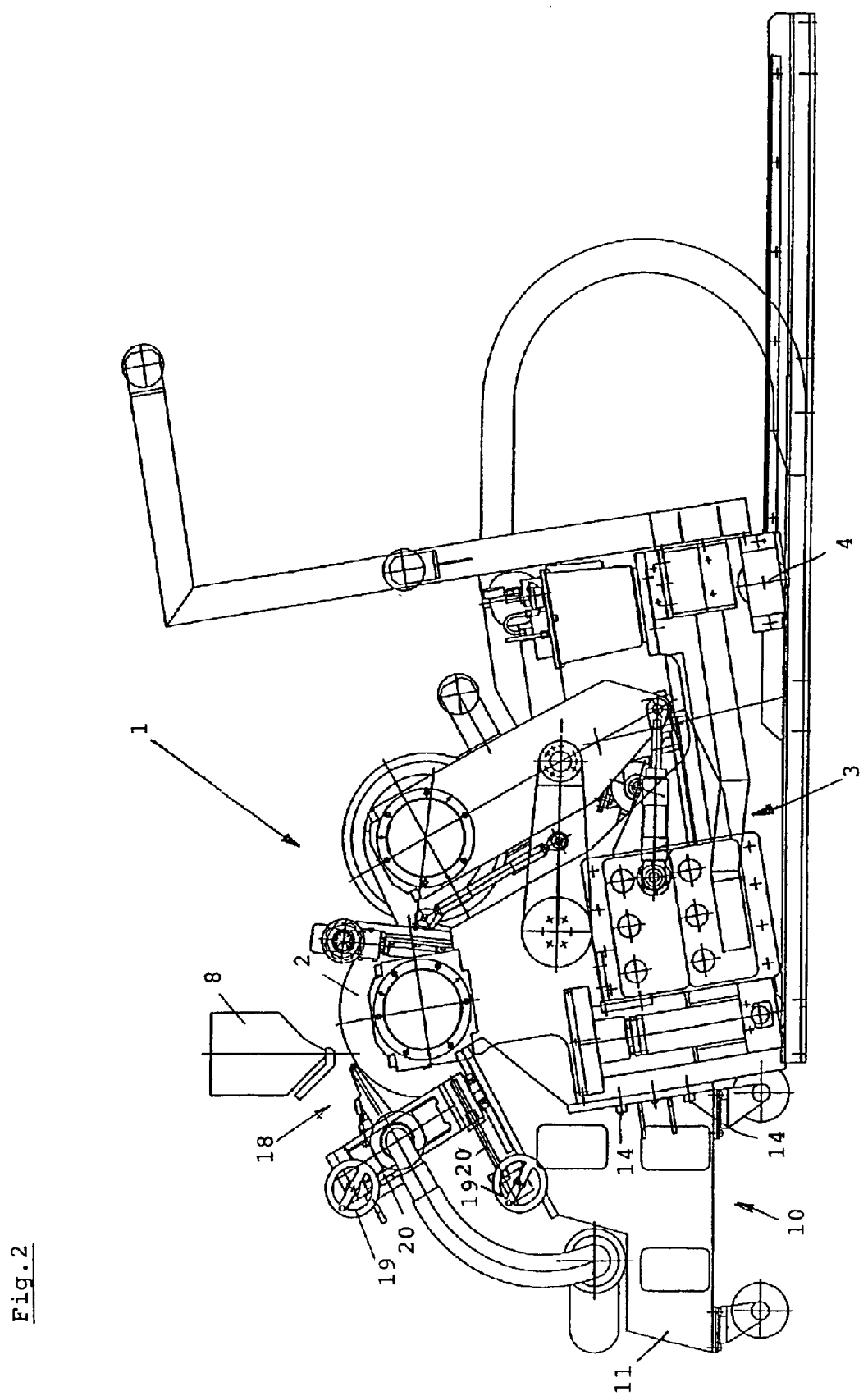
FIG. 2 shows a view of a device for manufacturing plastics films similar to FIG. 1, but having an air knife for pressing the plastics film against a roll of the roll frame.

In FIG. 2 a calender 1 is shown, in which the roll frame 3 corresponds to that of the calender of the device shown in FIG. 1, but in place of the module 10, which has a smoothing roll 9 for pressing the plastics film against the chill roll 2, a module 10 is shown which has an air knife 18.

Using the module 10 shown in FIG. 2 and having an air knife 18, plastics films can be manufactured with a substantially thinner, and also smoother and more brilliant surface, compared with a device having a smoothing roll 9. For example, with the air knife 18 as the contact-pressing device, polypropylene films having a thickness <100 $\mu$m can be manufactured, whilst the smoothing roll 9 shown in FIG. 1 is especially suitable for the manufacture of polypropylene films with a thickness >500 $\mu$m.

When the roll frame 3 is in the position shown in FIG. 2, it is represented in its downward-pivoted position compared with the position about the axis 4 shown in FIG. 1, whereby the modular trolley 11 can easily be connected to the roll frame 3 by sliding up to it. After the module 10 has been fastened to the roll frame 3 by means of the fastening screws 14, it is pivoted in the direction of the nozzle 8 into its upward-pivoted production position.

For the fine adjustment of the air knife 18 relative to the chill roll 2, it is arranged on the trolley 11 such that it is adjustable by means of handwheels 19, which are respectively connected to a spindle drive 20.

In FIG. 3, the roll frame 3 of the calender 1 is likewise shown in its downward-pivoted module-changing position, a module 10, with a continuous band 22 looped around two deflection rolls 21, being shown in a position not yet fastened to the roll frame 3.

The continuous band 22 is especially suitable for the manufacture of plastics films with a thickness of between 50 and 500 $\mu$m and is thus especially suited to those fields in which neither the smoothing roll 9 shown in FIG. 1 nor the air knife 18 shown in FIG. 2 are particularly well suited.

For the fastening of the module 10 to the roll frame 3, the trolley 11 is slid up to the roll frame 3 in the direction 23, after which, by means of centering bolts 13 provided on both sides in laterally disposed stop plates 24, the module 10 is aligned relative to the roll frame 3 and then fastened to the roll frame 3 by means of screws 14.

In order to supply the module 10 with electricity, air, hydraulic fluid and a medium for chilling the rolls 21, within the trolley 10 connections 16 are once again provided, which, by means of plug connections, can be connected via lines (not shown) to corresponding connections 17 on the roll frame 3.

Using the modules 10 shown in FIGS. 1 to 3, a calender 1 can thus be converted within a very short time (the conversion time should not generally exceed 45 minutes) for the manufacture or smoothing of various plastics films of different thickness and different surface roughness, surface structure or surface finish. Moreover, the possibility is also given of a quick and easy exchange of a module, should this be necessary due to wear phenomena.

In FIG. 4 the centering bolt 13 for centering the module 10 on the roll frame 3 is further illustrated in detail, which centering bolt comprises a conical sleeve 25 in a recess 26 of the stop plate 24 and is fastened by means of a screw 27, a centering pin 28 additionally being provided for the exact alignment of the conical sleeve 25.

FIGS. 5 to 8 show a module for the surface-pressing of the plastics film, i.e. a soft box 29, for pressing the plastics film against the chill roll 2, a trolley as in the modules 10 shown in FIGS. 1 to 3 not being represented in FIGS. 5 to 8, but the soft box 29 provided for the surface-pressing can, of course, be fitted on various modules 10 allowing simple exchange, so that the device 1 can be easily converted between different manufacturing methods for the manufacture of plastics films of different type. The soft box 29 represented in FIGS. 5 to 8 can herein especially be used to produce plastics films with a thickness of less than 50 $\mu$m and an extremely smooth surface.

We claim:

1. A device for manufacturing plastics films with different characteristics from a plastics melt, comprising a roll frame, at least one chill roll rotatably mounted in the roll frame, exchangeable modules, for pressing the plastics melt against the chill roll for chilling the plastics melt, the exchangeable modules being individually and separately attachable to the roll frame, for the manufacture of plastics films with different characteristics, each of the exchangeable modules designed to manufacture plastics films with different characteristics by different manufacturing methods.

2. Device according to claim 1, wherein the exchangeable modules are attachable to the roll frame such that they can be displaced or pivoted.

3. Device according to claim 1, wherein two chill rolls for chilling the plastics film are rotatably mounted in the roll frame.

4. Device according to claim 1, wherein one of the modules for pressing and chilling the plastics film has a roll with a plastics surface, a metal roll or an embossing roll.

5. Device according to claim 1, wherein one of the modules for pressing and chilling the plastics film is designed for surface-pressing of the plastics film.

6. Device according to claim 1, wherein a device for introducing the plastics melt is disposed between the module for pressing and chilling the plastics film, in the fastened state, and a first roll mounted in the roll frame.

7. Device according to claim 1, wherein at least one of the modules for pressing and chilling the plastics film is disposed on a trolley having a plurality of rolls.

8. Device according to claim 1, wherein at least one centering bolt is provided for connecting the modules to the roll frame.

9. Device according to claim 1, wherein the modules have at least one conical centering bolt, which is tapered in the direction of its free ends.

10. Device according to claim 7, wherein the modules have at least one conical centering bolt and an axis of the conical centering bolt is arranged essentially perpendicular to a stop plate of the trolley.

11. Device according to claim 7, wherein screws are provided for fastening the trolley to the roll frame.

12. Device according to claim 1, wherein plug connections are provided for the connection of coolant lines between the module modules and the rest of the device.

13. Device according to claim 1, wherein plug connections are provided for the connection of hydraulic and/or pneumatic lines between the modules and the rest of the device.

14. Device according to claim 1, wherein plug connections are provided for the connection of power lines between the modules and the rest of the device.

15. A device for manufacturing plastics films from a plastics melt and having a roll frame in which at least one chill roll is rotatably mounted, an exchangeable part of the device, for pressing the plastics melt against the chill roll mounted in the roll frame and for chilling the same, being attachable to the roll frame, characterized in that, for the manufacture of plastics films with different characteristics, various modules are provided as the exchangeable part, so that the device allows different plastics films to be made by means of different manufacturing methods, wherein the module for pressing and chilling the plastics film has a continuous band, optionally chilled, for surface-smoothing.

16. A device for manufacturing plastics films from a plastics melt and having a roll frame in which at least one chill roll is rotatably mounted, an exchangeable part of the device, for pressing the plastics melt against the chill roll mounted in the roll frame and for chilling the same, being attachable to the roll frame, characterized in that, for the manufacture of plastics films with different characteristics, various modules are provided as the exchangeable part, so that the device allows different plastics films to be made by means of different manufacturing methods, wherein the module for pressing and chilling the plastics film has an air knife.

* * * * *